UNITED STATES PATENT OFFICE

RUFUS S. MERRILL, OF CAMBRIDGE, MASSACHUSETTS, ASSIGNOR, BY MESNE ASSIGNMENTS, TO WM. B. MERRILL, JOSHUA MERRILL, AND RUFUS S. MERRILL.

IMPROVEMENT IN HEAVY HYDROCARBON OILS FOR ILLUMINATION.

Specification forming part of Letters Patent No. 100,915, dated March 15, 1870; reissue No. 7,096, dated May 2, 1876; application filed March 8, 1876.

DIVISION B.

*To all whom it may concern:*

Be it known that I, RUFUS S. MERRILL, of Cambridge, in the county of Middlesex and State of Massachusetts, have invented a certain new and useful product obtained from the distillation of coal, shale, and petroleum, and having a very high igniting and fixed distilling-point, being an oil which, possessing properties of great value and importance as a cheap, safe, and brilliant illumination material, constitutes a new commodity or article of manufacture and trade heretofore unknown, and not sold or used as such.

In the specification annexed—reissue, Division A, of my Letters Patent No. 100,915, dated March 15, 1870—I have described a method of burning such oils for illuminating purposes, an invention or discovery which led me to experiment upon methods to produce on a manufacturing scale—that is to say, with a degree of certainty and economy—an oil possessing the qualities before indicated, which may have and has been produced in the manufacture of other products of distillation incidentally or accidentally, without any known rule or method therefor, and which were useless, and the production of which was therefore avoided as much as possible.

In order to fully understand the nature of my invention, it will be necessary for me to describe the processes usually practiced in the manufacture of petroleum and such like hydrocarbon oils, and to show wherein my present invention differs from them.

The process may be divided into two classes, as follows: First, the distillation known as the "cracking process," when the object is to make from the crude oil the largest possible percentage of kerosene or ordinary refined petroleum oil; second, the process known as "true fractional distillation," when the object to be attained is the production of oils of differing characteristics and uses, such as naphthas, kerosene-oil, paraffine or lubricating oils, and paraffine-wax.

In practicing the process first mentioned, the crude oil is placed in a suitable distilling-vessel provided with a suitable condensing apparatus, and when the manhole-plates are properly secured a fire or fires are started under the still. The oil when sufficiently heated begins to vaporize. The vapors arriving in the still pass over through the condenser, and are condensed again into liquid. The first to pass over is naphtha of very light gravity, and is very volatile. This is allowed to run into suitable tanks, until the gravity reaches about 60° Baumé at 60° Fahrenheit. At this point the stream from the condenser is changed into another tank, and the distillation continued so long as the oil runs comparatively white in color, and of a gravity of about from 42° to 43° Baumé. At this point the oil begins to grow yellow in color, and feels slightly oily between the thumb and finger, and it is at this stage of the distillation that the "cracking process," so called, begins. The fires are reduced under the still by damping, and the stream of oil flowing from the condenser is greatly lessened, the process being so conducted that the heavy oil remaining in the still is lifted in vapors, and again condensed in the still, and falls back, to be again and again vaporized and condensed, the lighter vapors, which are formed by this process, alone passing over to the condenser and out at the outlet. These lighter vapors when condensed form an oil of much the same general characteristics as that already distilled over for burning oil, being of light gravity of about 45° or 46° Baumé, comparatively white in color, thin in body, and mobile like kerosene-oil. This process is continued until only from five to eight per cent. of the crude oil placed in the still is left in the form of a black residuum, which, when sufficiently cooled after removing the fires from under the still, is drawn off and usually again distilled, to be manufactured into paraffine-oils, and sometimes the paraffine-distillates are again returned to the crude oil, to again go through the cracking process, until eventually it is all cracked up into thin and low fire-test, or ordinary kerosene-oil, or refined petroleum.

The second process referred to, known as the fractional distilling process, is directly the reverse of the one just described, and is designed to separate petroleum into its various products of naphtha, kerosene, paraffine, lubricating-oils, and paraffine-wax. In working by this process the crude oil is placed in a suitable distilling apparatus, to which a condensing coil or pipes are secured, the same practically as is used in the process first described. Crude oil is placed in the still, usually filling it two-thirds to three-quarters full, and a fire started under the bottom of the still, and the oil heated until vapor arises and passes over to the condenser, when, coming in contact with cold surfaces, the condenser being immersed in cold water, which is constantly renewed from a supply-tank, the vapor is condensed and flows out a liquid. The first to pass over is, as in the cracking process, naphtha. This is allowed to run into a suitable tank until the gravity reaches about 60° Baumé hydrometer. The fire being continued under the still, the distillation goes on as at first described, and the stream of oil being at this gravity conducted into another tank for kerosene oil the distillation goes on precisely the same as in the process first described until the burning or kerosene-oil portion is all distilled over, which is known by the oil growing slightly yellow in color and heavy in gravity. The kerosene or burning oil usually embraces the portion distilling over between 60° and 42° to 43° Baumé, and from sixty to seventy per cent. of the crude oil placed in the still is distilled over in the form of naphtha and burning or kerosene oil. Up to this stage of the distillation the processes have been conducted precisely alike; but now the essential difference of the fractional distillation from the cracking process begins. Instead of now reducing the fires under the still, and so conducting the process of distilling that the cracking of the heavier oils left in the still will be the result, the fire is somewhat increased, and the distillation goes on rapidly. The stream of oil from the condenser is conducted into a suitable tank until about 38° to 36° Baumé is reached. This oil coming over from 42° to 36° Baumé I call "intermediate oil," which is too heavy and fixed for kerosene or the ordinary refined petroleum-oil, and too light and thin for lubricating-oil. To this I shall refer further on, as the product I produce from it constitutes the invention I have made. After the gravity reaches from 36° to 38° Baumé, the stream of oil is again changed into a suitable tank, and distillation carried on in as rapid a manner as possible to prevent cracking of the oil, and it is continued until the oil is all distilled over, or until a small quantity of residuum is left in the still. The last-named oil—that is to say, the oil that passes over between from 36° to 38° Baumé, and the final finishing of the distillation—is paraffine-oil, heavy in body and gravity, containing abundance of paraffine, which, by suitable or well-known process, is made into the paraffine lubricating-oil of commerce. I now refer to the intermediate oil alluded to before. This oil usually comprises that portion of the fractional distillation of hydrocarbon oils between 42° and 36° Baumé.

It has been the custom of manufacturers of oil to subject this oil to the cracking process, in order to make it into thin illuminating-oil, like kerosene. It is also frequently put back into crude oil, and with the whole mass of oil subjected to the cracking process, and thus allowed to mix with the products of distillation of the crude oil. By these processes it is gotten rid of and utilized. It must be borne in mind that when this intermediate oil is mixed with kerosene without the process of cracking it into thin oils being applied to it, it greatly injures the kerosene, causing it to change in color, to burn badly in lamps, *i. e.*, crusting the wicks and causing the flames to fail when the oil is only slightly reduced in the lamp. Although it has, in past years, been somewhat resorted to, to mix it with the kerosene, it is not so practiced at the present time, but it is subjected to the cracking process either alone or mixed with crude oil, and so worked until it is finally all cracked up and lost sight of in the mass of oil produced. Attempts have been made to utilize this oil by mixing it with the heavy paraffine oil, before alluded to, and naphtha, and by subjecting the mixture to distillation; but an inferior and dangerous oil has been the result of this mixing and distilling process.

The heavy oil passing over under the influence of the higher temperatures, is, however, variable in its nature as to density and fire-tests. From oils having the desired fire-test of 200° Fahrenheit, oils of higher, and for illuminating purposes impracticable, points of ignition are reached. On the whole the quantity of heavy oil which answers the condition of my invention is so small that it would be impracticable to collect it for the purposes of commerce and trade.

To obtain this oil in any desired quantity and of a permanent character as to the requisite fire-test, I proceed as follows: I take the intermediate oil, so-called, which is really a combination or mixture of heavy oils of various densities and boiling-points, and redistil it at a comparatively low temperature. The vapors are passed through a condenser and liquefied.

The intermediate oil may thus be almost entirely converted into heavy oils of the desired consistency and fire-test. Only a comparatively small quantity of very heavy oil will remain in the still, which may be used as, or made into, an excellent lubricating oil by processes it is unnecessary here to describe.

The oil thus produced burns with great beauty and brilliancy, with a white and highly-illuminating flame when burned in suitably-constructed lamps; and the oil so produced has the following new and valuable qualities that render it of great practical value in the art as a new manufacture and commerce not heretofore known or used: First, it has a very high distilling-point; second, it has a very high igniting-point, and will not give off inflammable vapors at any temperature below 200° Fahrenheit; third, it is perfectly safe for illuminating purposes for lighting railroad-cars, factories, steam-ships, and for other domestic uses; it is safe to transport and store; fourth, it gives a beautiful white light when burned in suitably-constructed lamps; fifth, it is cheap and burns economically. In actual practice, a lamp giving the light of twelve sperm candles can be maintained at a cost of less than one cent per hour.

Having thus described my invention, what I claim, and desire to secure by Letters Patent, is—

As an article of manufacture an illuminating-oil derived from petroleum, coal, shale, and schist, emitting no inflammable vapor at a temperature of less than 200° Fahrenheit, as herein set forth.

In testimony whereof I have hereunto signed my name this 6th day of March, A. D. 1876.

RUFUS S. MERRILL.

Witnesses:
JOSIAH DAVIDSON,
MARK HOLLINGSWORTH.